United States Patent
Xu et al.

(10) Patent No.: US 7,974,039 B1
(45) Date of Patent: Jul. 5, 2011

(54) DISK DRIVE TO REDUCE HEAD INSTABILITY

(75) Inventors: Jianfeng Xu, San Jose, CA (US); Soo-Choon Kang, San Jose, CA (US); Kazuhiro Saito, San Jose, CA (US); Hongchao Tim Zhao, San Jose, CA (US)

(73) Assignee: Western Digital Technology, Inc., Irvine, CA (US)

( * ) Notice: Subject to any disclaimer, the term of this patent is extended or adjusted under 35 U.S.C. 154(b) by 0 days.

(21) Appl. No.: 12/486,682

(22) Filed: Jun. 17, 2009

(51) Int. Cl.
*G11B 21/02* (2006.01)
*G11B 27/36* (2006.01)

(52) U.S. Cl. .......................... 360/75; 360/31

(58) Field of Classification Search .................. None
See application file for complete search history.

(56) References Cited

U.S. PATENT DOCUMENTS

| | | | |
|---|---|---|---|
| 7,092,195 B1 | 8/2006 | Liu et al. | |
| 7,158,325 B1 | 1/2007 | Hu et al. | |
| 7,180,692 B1 | 2/2007 | Che et al. | |
| 7,215,495 B1 | 5/2007 | Che et al. | |
| 7,365,931 B2 * | 4/2008 | Ikai et al. | 360/75 |
| 7,423,830 B2 | 9/2008 | Ma et al. | |
| 7,436,620 B1 | 10/2008 | Kang et al. | |
| 7,440,220 B1 | 10/2008 | Kang et al. | |
| 7,457,073 B2 | 11/2008 | Kurita et al. | |
| 2007/0230002 A1 | 10/2007 | Kassab | |
| 2007/0230015 A1 | 10/2007 | Yamashita et al. | |
| 2007/0291401 A1 | 12/2007 | Sun et al. | |
| 2008/0158704 A1 | 7/2008 | Knigge et al. | |
| 2008/0239581 A1 | 10/2008 | Ikai et al. | |
| 2009/0268330 A1 * | 10/2009 | Lee et al. | 360/31 |

OTHER PUBLICATIONS

Canchi, et al., "Experimental Investigation of Thermal Fly-height Control (TFC) Slider Dynamics Under Contact", INSIC 2008 Annual Meeting, Dec. 11, 2008, Milpitas, California, 23 pages.

* cited by examiner

*Primary Examiner* — Andrew L Sniezek

(57) ABSTRACT

A disk drive to reduce head instability during disk drive manufacturing is disclosed. The disk drive comprises: a disk; a dynamic flying height (DFH) read/write head; a flying height actuator to control the spacing between the DFH read/write head and the disk; and a controller. The controller controls operations in the disk drive including applying a sloped increasing power between a first voltage and a second voltage to move the DFH read/write head towards the disk.

16 Claims, 6 Drawing Sheets

DISK DRIVE TO REDUCE HEAD INSTABILITY

BACKGROUND

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes one or more disks wherein each disk includes a plurality of concentric tracks. Each surface of each disk conventionally contains a plurality of concentric data tracks angularly divided into a plurality of data sectors. In addition, special servo information may be provided on each disk to determine the position of the moveable transducer head.

The transducer head typically includes a reader and writer for reading and/or writing data from and to the disk, respectively. The transducer head is typically mounted on a head carrier. The head carrier is commonly an air-bearing slider attached to an actuator arm by a suspension and is positioned very close to the disk surface by the suspension.

The spacing between the head and the disk surface is called the flying height. The slider typically has a disk-facing air-bearing surface (ABS) that causes the slider to ride on a cushion or bearing of air generated by the rotation of the disk. The slider is typically attached to a flexure on the suspension and the suspension includes a load beam that applies a load force to the slider to counteract the air-bearing force while permitting the slider to "pitch" and "roll". The flying dynamics of the slider and thus the flying height of the head are influenced by factors such as rotation speed of the disk, the aerodynamic shape of the slider's ABS, the load force applied to the slider by the suspension, and the pitch and roll torques applied to the slider by the suspension.

Disk drives may utilize a flying height actuator for changing the spacing between the head and the disk surface. One type of flying height actuator utilizes a thermal actuator with an electrically-resistive heater located on the slider near the head. When current is applied to the heater, the heater expands and causes the head to "protrude" such that it moves closer to the disk surface. The flying height actuator should be accurately calibrated so that the head-disk spacing can be controlled. The calibration often requires that the value of the control signal that results in the onset of head-disk contact (HDC) be known.

Presently, during disk drive manufacturing, a head-disk touchdown calibration value is determined by applying a dynamic flying height (DFH) voltage to the head until a touchdown detection occurs. The DFH voltage is typically applied by a flying height actuator (FHA). The DFH voltage is typically square-waved such that its profile consists of an instant rise of voltage at a leading end, constant voltage applied over at least one revolution, and an instant falling voltage at a trailing end.

Unfortunately, the square-waved DFH voltage often causes head instability during touchdown detection. The head instability often results in false touchdown detection followed by incorrect preamplifier settings or undesirable head-disk interaction which causes carbon wear on the slider surface and lubricant degradation on the disk media surface.

Therefore, there is a need in the disk drive manufacturing process to better apply DFH voltage to prevent head instability and to improve touchdown detection.

DETAILED DESCRIPTION

Figure 1:
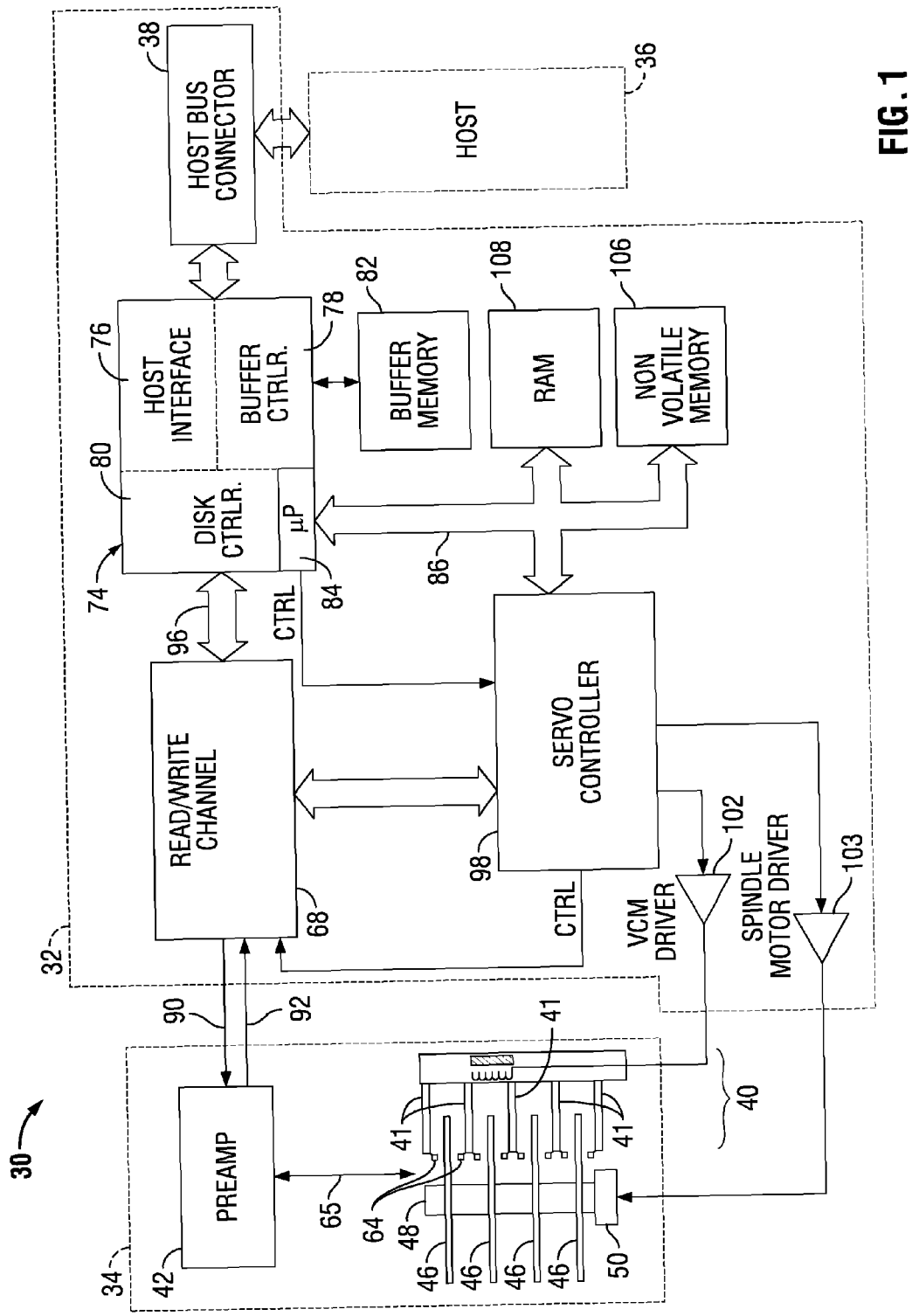
FIG. 1 shows a simplified block diagram of a disk drive, in which embodiments of the invention may be practiced.

FIG. 1 shows a simplified block diagram of a disk drive 30, in which embodiments of the invention may be practiced. Disk drive 30 comprises a Head/Disk Assembly (HDA) 34 and a controller printed circuit board assembly (PCBA) 32. Host 36 may be a computing device such as a desktop computer, a laptop computer, a server computer, a mobile computing device (e.g. PDA, camera, cell-phone, etc.), or any type of computing device. Alternatively, host 36 may be a test computer that performs calibration and testing functions as part of the disk drive manufacturing process. Disk drive 30 may be of a suitable form factor and capacity for computers or for smaller mobile devices (e.g. a small form factor (SFF) disk drive).

HDA 34 comprises: one or more disks 46 for data storage; a spindle motor 50 for rapidly spinning each disk 46 (four shown) on a spindle 48; and an actuator assembly 40 for moving a plurality of heads 64 over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 may include a read/write channel 68, servo controller 98, host interface and disk controller (HIDC) 74, voice coil motor (VCM) driver 102, spindle motor driver (SMD) 103, microprocessor 84, and several memory arrays—buffer or cache memory 82, RAM 108, and non-volatile memory 106.

Host initiated operations for reading and writing data in disk drive 30 may be executed under control of microprocessor 84 connected to the controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as may be needed for execution.

During disk read and write operations, data transferred by preamplifier 42 may be encoded and decoded by read/write channel 68. During read operations, read/write channel 68 may decode data into digital bits transferred on an NRZ bus 96 to HIDC 74. During write operations, HIDC may provide digital data over the NRZ bus to read/write channel 68 which encodes the data prior to its transmittal to preamplifier 42. As one example, read/write channel 68 may employ PRML (partial response maximum likelihood) coding techniques, although other coding processes may also be utilized.

HIDC 74 may comprise a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103. For example, disk drive 30 may employ a sampled servo system in which equally spaced servo wedges are recorded on each track of each disk 46. Data sectors are recorded in the intervals between servo wedges on each track. Data sectors may also be split such that a single data sector is recorded on both sides of an intervening servo wedge. Servo wedges are sampled at regular intervals by servo controller 98 to provide servo position information to microprocessor 84. Servo wedges are received by read/write channel 68, and are processed by servo controller 98 to provide position information to microprocessor 84 via bus 86.

For example, in one embodiment, a plurality of servo wedges may be servo-written circumferentially around disk 46 to define circumferential tracks and may be utilized in seeking and track following. In particular, embedded servo wedges may contain servo information utilized in seeking and track following and may be interspersed between data regions on the disk. Data may be conventionally written in the data regions in the plurality of discrete data sectors. Each data region may typically be preceded by a servo wedge. Each servo wedge may include a phase lock loop (PLL) field, a servo sync mark (SSM) field, a track identification (TKID) field, a sector identifier (ID) field, and a group of servo bursts that the servo control system samples to align the moveable transducer head with, and relative to, a particular track.

For example, servo controller 98 may move head 64 toward a desired track during a "seek" mode using the TKID field as a control input. Once head 64 is generally over a desired track, servo controller 98 may use the servo burst to keep head 64 over the track in a "track follow" mode. During track following mode, head 64 repeatedly reads the sector ID of each successive servo wedge to obtain the binary encoded sector ID number that identifies each wedge of the track. Based on the TKID and sector ID, sector controller 98 continuously knows where head 64 is relative to disk 46 and communicates this to microprocessor 84. In this way, microprocessor 84 continuously knows where head 64 is relative to the disk and can command the movement of the head 64, via the servo control system, to implement disk drive operations, such as seeking, tracking, read/write operations, etc.

Figure 2:
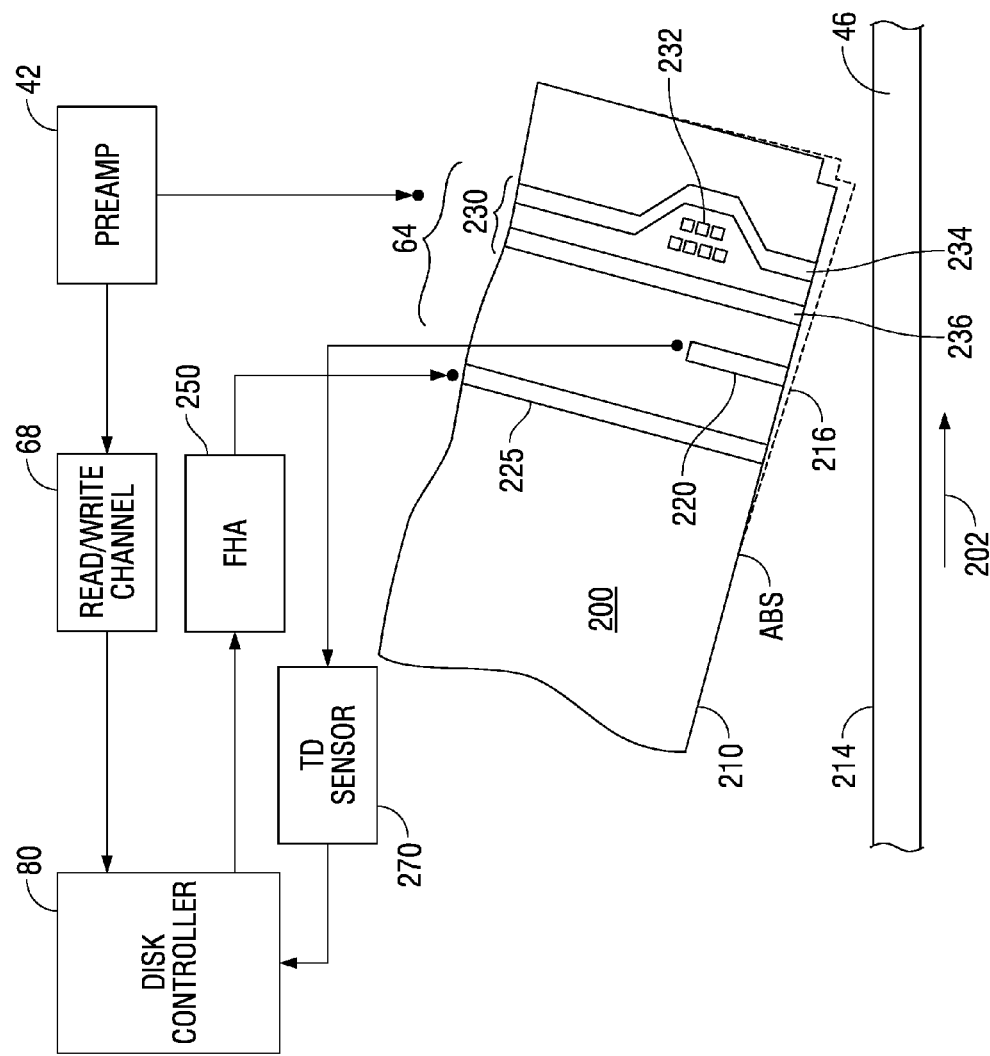
FIG. 2 is a sectional view of the end portion of a slider above the surface of a disk of the disk drive, according to one embodiment of the invention.

FIG. 2 is a sectional view of the end portion of a slider 200 above the surface of disk 46 of disk drive 30, according to one embodiment of the invention. In this embodiment, slider 200 is positioned near the surface 214 of disk 46 and is an air-bearing slider having an air-bearing surface (ABS) 210 facing toward the disk surface 214. Slider 200 supports the read/write transducer head 64 for reading and writing data from and to the magnetic media on the disk surface 214. Slider 200 may be attached to actuator arm 41 of FIG. 1 by a suspension. The suspension may provide a spring force that biases slider 200 towards the disk surface 214. It should be appreciated that another slider, also supporting read/write heads, may be positioned to the other surface of the disk and may be attached to another actuator arm by means of a suspension.

The rotation of disk 46 in the direction of arrow 202 generates an air bearing between the ABS of slider 200 and disk surface 214. During operation of the disk drive, the air-bearing counterbalances the slight spring force of the suspension and supports the slider 200 off and slightly away from the disk surface 214 by a small, substantially constant spacing.

FIG. 2 also shows read/write head 64 including a MR read head 220 and write head 230. Write head 230 may be an inductive write head with a coil 232 located between two write poles 236 and 234.

Slider 200 may also include a flying height actuator for changing the spacing between read/write head 64 and disk surface 214. The type of flying height actuator may be, for example, a thermal actuator with an electrically-resistive heating element or heater 225 electrically connected to and controlled by a flying height actuator (FHA) 250. FHA 250 may be a power source that controls the amount of voltage applied to heater 225, such as by controlling the settings of a variable resistor. As the voltage increases, heater 225 may expand causing the protrusion of head 64, as shown by dash line 216, which moves the MR read head 220 and pole tips 234 and 236 of write head 230 closer to disk surface 214. FHA 250 may include a temperature feedback control circuit that monitors the temperature of heater 225 to maintain the flight height of head 64 (hereinafter dynamic flying height (DFH) head) within a desired range during operation of the disk drive.

FIG. 2 further illustrates disk controller 80, read/write channel 68, and preamplifier 42 connected to DFH head 64, as previously described in detail. FIG. 2 additionally illustrates a touchdown (TD) sensor 270. TD sensor 270 is connected to MR read head 220 to measure a spacing signal between the DFH read/write head 64 and the disk surface 214 of disk 46. The TD sensor 270 may be located inside the disk drive or outside of the disk drive for disk drive manufacturing purposes.

In one embodiment, disk controller 80 may operate under the control of a program or routine to execute methods or processes in accordance with embodiments of the invention related to reducing head instability during disk drive manufacturing when determining a touchdown calibration value for the DFH read/write head 64. In particular, disk controller 80 may control operations in the disk drive including applying a sloped increasing power between a first voltage and a second voltage to move the DFH read/write head 64 towards disk 46.

Even more particularly, disk controller 80 may execute operations comprising: applying sloped increasing and decreasing power through FHA 250 to heater 225 to control the spacing between the DFH read/write head 64 and disk 46; calculating the spacing between the DFH head 64 and the disk 46 based upon a spacing signal received from the TD sensor 270; and determining a touchdown calibration value for the DFH read/write head 64.

For example, such a program may be implemented in the software or firmware (e.g., stored in a non-volatile memory 106 or other locations) and may be implemented by controller 80 or microprocessor 84.

For the purposes of the present specification, it should be appreciated that the terms "processor", "microprocessor", and "controller", etc., refer to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, etc. Further, it should be appreciated that the term processor, microprocessor, circuitry, controller, etc., refer to any type of logic or circuitry capable of executing logic, commands, instructions, software, firmware, functionality, etc.

Figure 3:
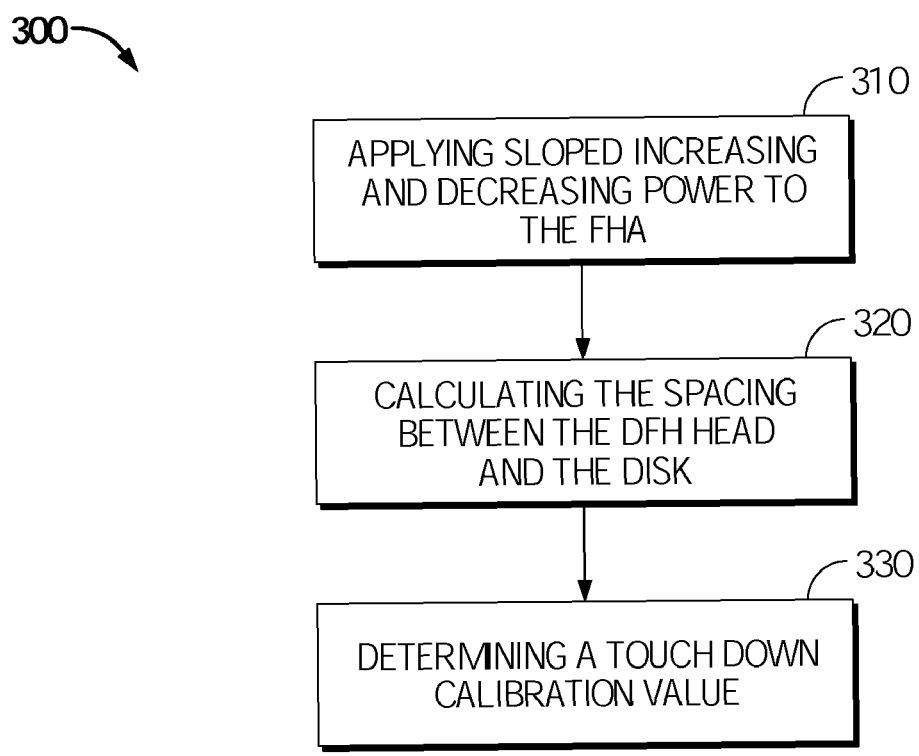
FIG. 3 is a flow diagram of a process to determine a touchdown calibration value for a disk of the disk drive during disk drive manufacturing, according to one embodiment of the invention.

FIG. 3 is a flow diagram of a process 300 to determine a touchdown calibration value for a disk of a disk drive during disk drive manufacturing, according to one embodiment of the invention. In one embodiment, process 300 may be implemented by disk controller 80 under the control of a program.

In process 300, under the control of disk controller 80, sloped increasing and decreasing power is applied by FHA 250 to move the DFH read/write head 64 towards the disk 46 (block 310). Next, the spacing between the DFH read/write head 64 and the disk 46 is calculated by disk controller 80 based upon a spacing signal received from the TD sensor 270 (block 320). Lastly, a touchdown calibration value is determined by the disk controller 80 for the DFH read/write head 64 (block 330).

Figure 4A:
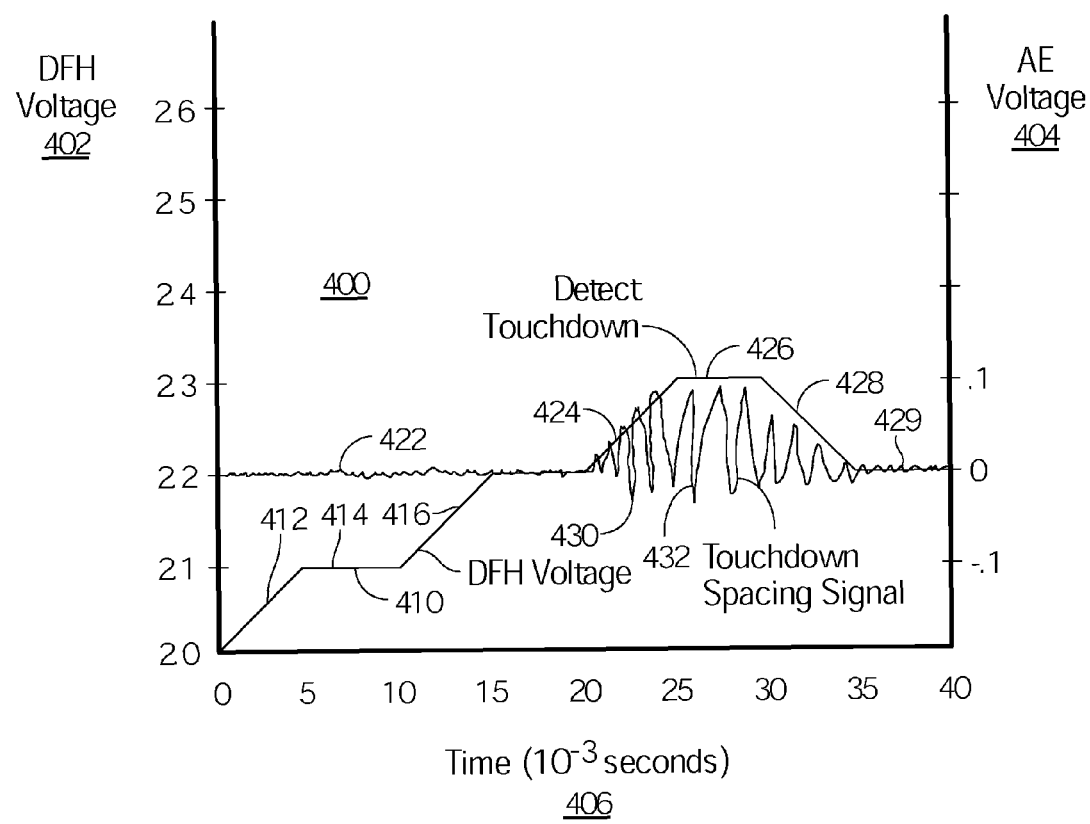
FIG. 4A is a diagram showing an example of determining a touchdown calibration value for a DFH read/write head, according to one embodiment of the invention.

FIG. 4A is a diagram showing an example of determining a touchdown calibration value for a DFH read/write head, according to one embodiment of the invention. Under the control of disk controller 80, a DFH voltage 410 may be applied by the FHA 250 to the heater 225 of the DFH read/write head in order to achieve a detected touchdown value 426.

As can be seen in FIG. 4A, the y-axis on the left-hand side illustrates DFH voltage 402 as applied by the FHA under the control of the disk controller and the y-axis on the right hand side illustrates the acoustic emission (AE) voltage 404 as read by the DFH reader head and measured by the TD sensor under the control of disk controller. The x-axis represents time in milliseconds.

As an illustration, in one embodiment, the disk controller commands FHA to apply sloped increasing power between 2.0 DFH voltage and 2.1 DFH voltage to the heater as shown by voltage line 412. At that point the DFH voltage is level at 2.1 volts as shown by voltage line 414. Next, the disk controller command the FHA to apply more sloped increasing power between 2.1 DFH voltage and 2.2 DFH voltage to the heater as shown by voltage line 416.

Upto this point, the AE voltage 422 remains basically static. However, next, when the disk controller commands the FHA to command another sloped increase in power between 2.2 DFH voltage and 2.3 DFH voltage as shown by voltage line 424, FIG. 4A clearly shows that the AE voltage touchdown spacing signal 430 increases dramatically indicating that the DFH head is approaching touchdown against the disk surface. Therefore, based upon this, the touchdown spacing signal 432 (at approximately 0.1 AE voltage) indicates approaching touchdown at the DFH voltage of 2.3 volts (level line 426). After this, a sloped decreasing power between 2.3 DFH voltage and 2.2 DFH voltage (line 428) is applied.

Thus, it is determined that the touchdown calibration value for the DFH read/write head should be set at a DFH voltage of 2.2 (level line 429) to optimally close to the disk surface and to avoid head-disk interaction.

It should be appreciated that the touchdown sensor measures this AE voltage to aid the controller in determining the touchdown calibration value. Further, once the touchdown calibration value for the DFH read/write head is determined, it may be saved in a non-volatile memory.

It should further be appreciated that during disk drive manufacturing, when the DFH voltage is applied to determine a touchdown calibration value that only a first and second voltage may be required, or that a greater number of voltages such as a first, second, and third voltage may be needed, or that even a greater number of voltages may be required dependent upon the testing criteria.

Figure 4B:
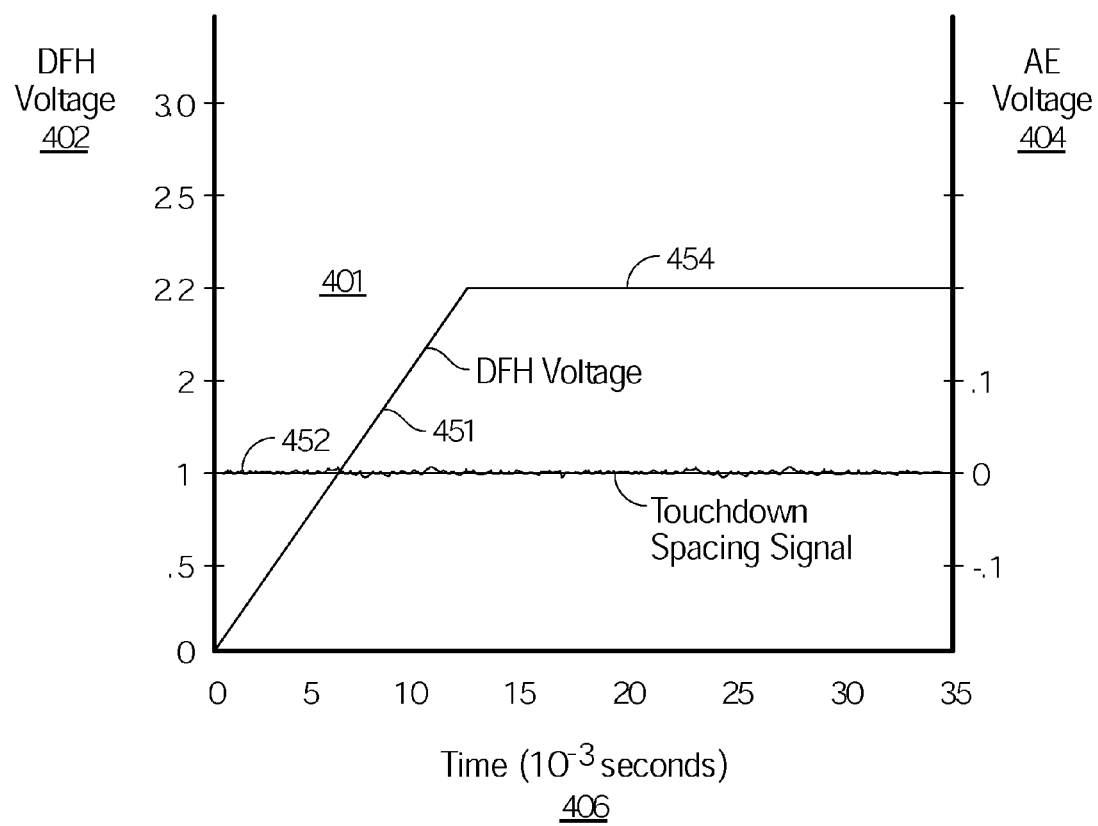
FIG. 4B is a diagram illustrating the DFH read/write head being automatically brought down for read and write operations with a pre-determined touchdown calibration value from non-volatile memory, according to one embodiment of the invention.

FIG. 4B is a diagram illustrating the DFH read/write head being automatically brought down for read and write operations with the pre-determined touchdown calibration value from non-volatile memory (e.g., 2.2 volts—determined in FIG. 4A). Particularly, under the control of the disk controller, the FHA applies sloped increasing power between 0 volts and 2.2 volts to the DFH head, shown as DFH voltage line 451, where it is leveled off at 2.2 volts (shown as DFH voltage line 454), such that the DFH head automatically achieves its optimized spacing from the disk surface at a pre-calibrated touchdown calibration value. As can be seen by the touchdown spacing signal 452 measured by the TD sensor, it remains stable the whole time.

In one embodiment, the sloped increasing power levels may be pre-determined by the thermal expansion rate of the heater 225 and the cooling effect of the air bearing 200 that is coupled to the DFH read/write head 64 (e.g., see FIG. 2). Further, the sloped decreasing power level may be similarly pre-determined by the thermal expansion rate of the heater 225 and the cooling effect of the air bearing 200 coupled to the DFH read/write head 64.

Figure 5:
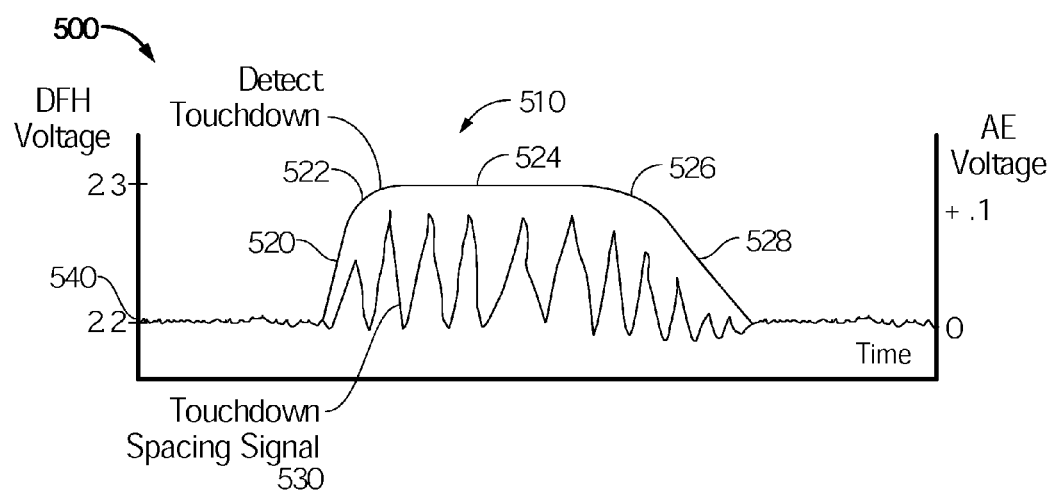
FIG. 5 illustrates an example of applying sloped increasing power and decreasing power to determine a touchdown calibration value utilizing pre-determined thermal expansion rates and cooling effects, according to one embodiment of the invention.

FIG. 5 illustrates an example 500 of applying sloped increasing power and decreasing power to determine a touchdown calibration value utilizing pre-determined thermal expansion rates and cooling effects, according to one embodiment of the invention. Again, as in FIG. 4, the y-axis represents DFH voltage and AE voltage and the x-axis represents time. In this embodiment, the disk controller controls the FHA to apply steeped sloped increasing power 520 followed by curved sloped increasing power 522 which results in an increased touchdown spacing signal 530 indicating that the head is close to touchdown. After this, level power 524, curved sloped decreasing power 526, and sloped decreasing power 528 are applied such that the predetermined touchdown calibration value of 2.2 volts for DFH voltage is confirmed.

In particular, in this example, the sloped increasing and decreasing power levels were based upon the thermal expansion rate of the heater and the cooling effect of the air bearing coupled to the DFH read/write head. Based upon this, FIG. 5 shows that the DFH voltage 540 (e.g. 2.2 volts) is the correct touchdown calibration value and confirms that it was accurately predicted.

While embodiments of the invention and its various functional components have been described in particular embodiments, it should be appreciated that the embodiments can be implemented in hardware, software, firmware, or combinations thereof.

The methods and processes previously described can be employed for disk drives having touchdown characteristics. However, numerous alternatives for disk drives or other types of storage devices with similar or other media format characteristics can be employed by those skilled in the art to use the invention with equal advantage to implement these techniques. Further, although embodiments have been described in the context of a particular type of disk drive, the invention can be employed in many different types of disk drives or other storage devices having a head that scans the media.

What is claimed is:

1. A disk drive to reduce head instability during disk drive manufacturing, the disk drive comprising:
   a disk;
   a dynamic flying height (DFH) read/write head;
   a flying height actuator to control the spacing between the DFH read/write head and the disk;
   a touch distance sensor to measure a spacing signal between the DFH read/write head and the disk; and
   a controller for controlling operations in the disk drive including: applying a sloped increasing power between a first voltage and a second voltage to move the DFH read/write head towards the disk; receiving the spacing signal from the touch distance sensor; determining if the DFH head is approaching touchdown based on the spacing signal, and if not, applying a second sloped increasing power between the second voltage and a third voltage;
   wherein, if at the third voltage, the DFH head is determined to be approaching touchdown based upon the spacing signal, a touchdown calibration value for the DFH read/write head to avoid head-disk interaction is set at the second voltage.

2. The disk drive of claim 1, wherein the controller further controls operations including applying a sloped decreasing power between the third voltage and the second voltage.

3. The disk drive of claim 2, wherein the sloped decreasing power level is determined by a thermal expansion rate of a heater and a cooling effect of an air bearing coupled to the DFH read/write head.

4. The disk drive of claim 1, wherein the touchdown calibration value for the DFH read/write head is saved in a non-volatile memory.

5. The disk drive of claim 1, wherein the flying height actuator to control the spacing between the DFH read/write head and the disk includes a thermal actuator comprising a heater.

6. The disk drive of claim 1, wherein the sloped increasing power level is determined by a thermal expansion rate of a heater and a cooling effect of an air bearing coupled to the DFH read/write head.

7. The disk drive of claim 1, wherein the controller further controls operations including applying steep sloped increasing power, curved sloped increasing power, level power, curved sloped decreasing power, and sloped decreasing power to the flying height actuator.

8. The disk drive of claim 1, wherein the second voltage is based on a touchdown calibration value stored in a non-volatile memory.

9. A method to reduce head instability during disk drive manufacturing, the method comprising:
   controlling the spacing between a dynamic flying height (DFH) read/write head and a disk;
   measuring a spacing signal between the DFH read/write head and the disk from a touch distance sensor;
   applying a sloped increasing power between a first voltage and a second voltage to the DFH read/write head to move the DFH read/write head towards the disk;
   determining if the DFH head is approaching touchdown based on the spacing signal, and if not,
   applying a second sloped increasing power between the second voltage and a third voltage, wherein, if at the third voltage, the DFH head is determined to be approaching touchdown based upon the spacing signal, a touchdown calibration value for the DFH read/write head to avoid head-disk interaction is set at the second voltage.

10. The method of claim 9, further comprising applying a sloped decreasing power between the third voltage and the second voltage.

11. The method of claim 10, wherein the sloped decreasing power level is determined by a thermal expansion rate of a heater and a cooling effect of an air bearing coupled to the DFH read/write head.

12. The method of claim 9, wherein the touchdown calibration value for the DFH read/write head is saved in a non-volatile memory.

13. The method of claim 9, wherein the flying height actuator to control the spacing between the DFH read/write head and the disk includes a thermal actuator comprising a heater.

14. The method of claim 9, wherein the sloped increasing power level is determined by a thermal expansion rate of a heater and a cooling effect of an air bearing coupled to the DFH read/write head.

15. The method of claim 9, further comprising:
   applying steep sloped increasing power to the DFH read/write head;
   applying curved sloped increasing power to the DFH read/write head;
   applying level power to the DFH read/write head;
   applying curved sloped decreasing power to the DFH read/write head; and
   applying sloped decreasing power to the DFH read/write head.

16. The method of claim 9, wherein the second voltage is based on a touchdown calibration value stored in a non-volatile memory.

* * * * *